GEORGE SMITH.
Improvement in Carriers for Unloading Hay.
No. 116,230. Patented June 20, 1871.
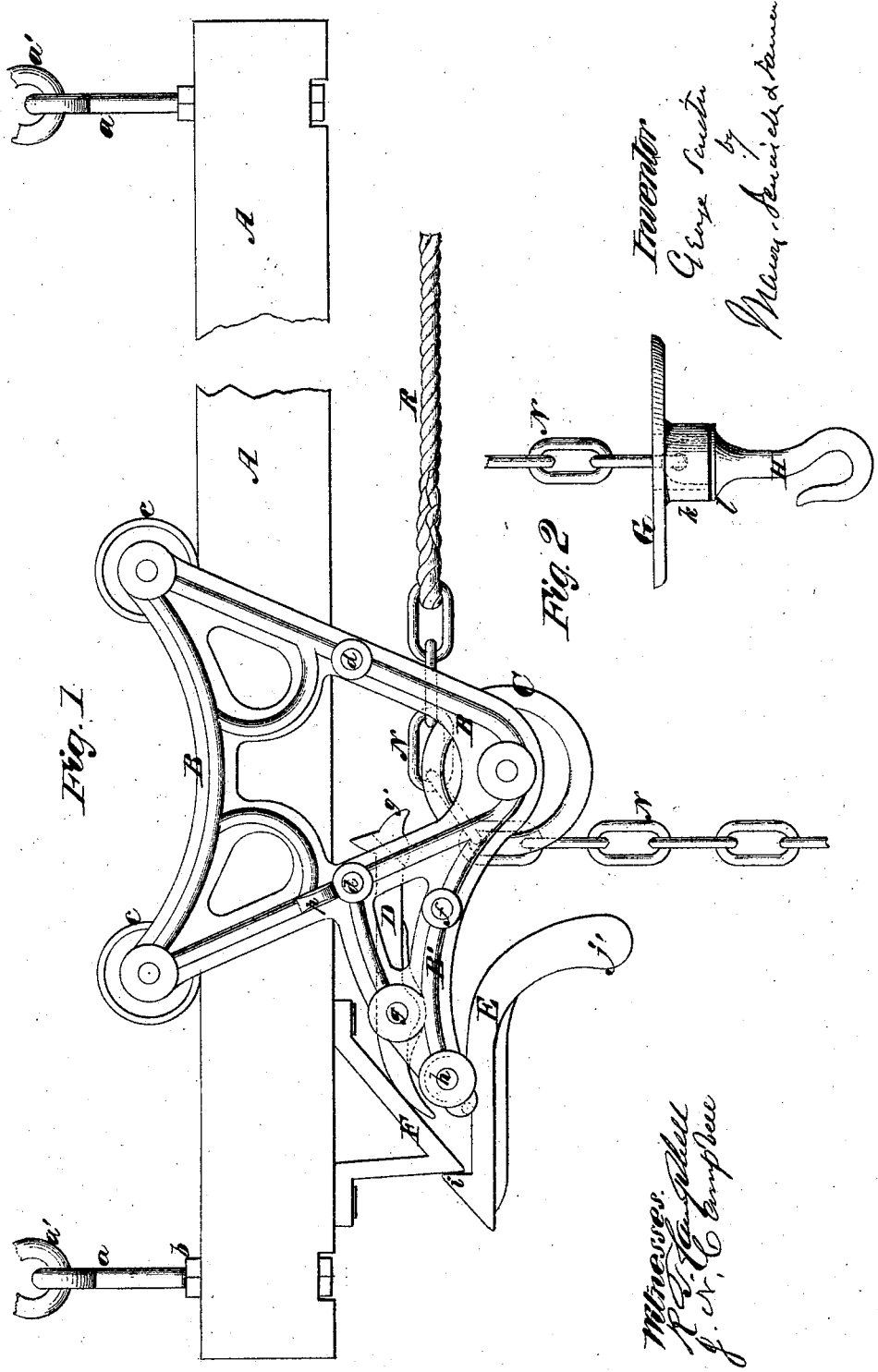

2 Sheets--Sheet 2.
GEORGE SMITH.
Improvement in Carriers for Unloading Hay.
No. 116,230. Patented June 20, 1871.
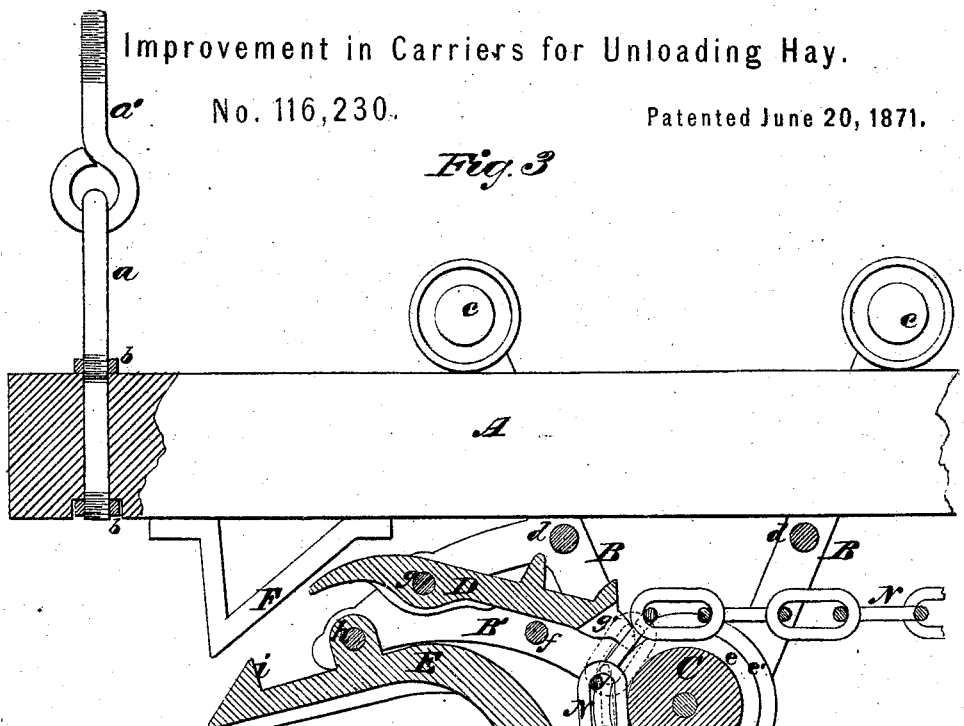
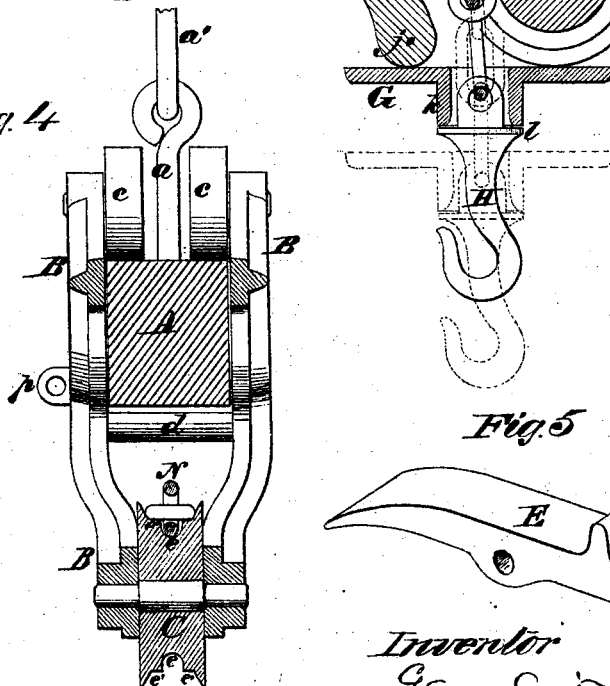
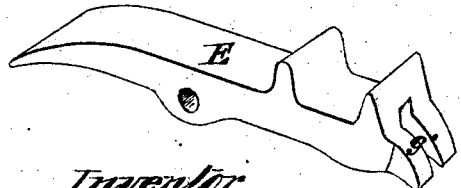
Witnesses
Inventor

UNITED STATES PATENT OFFICE.

GEORGE SMITH, OF ROCHESTER, NEW YORK, ASSIGNOR TO JOHN C. DE LANY, OF DETROIT, MICHIGAN.

IMPROVEMENT IN CARRIERS FOR UNLOADING HAY.

Specification forming part of Letters Patent No. 116,230, dated June 20, 1871.

*To all whom it may concern:*

Be it known that I, GEORGE SMITH, of Rochester, in the county of Monroe and State of New York, have invented certain new and useful Improvements on Carriers for Hay-Unloading Apparatus; and I do hereby declare that the following is a full, clear, and exact description thereof, reference being had to the accompanying drawing making part of this specification, in which—

Figure 1, Plate 1, is an elevation of one side of the carrier and its suspended track. Fig. 2, Plate 1, is a side view of the tripping-plate and a hook which is attached to a chain on the elevating-rope. Fig. 3, Plate 2, is a longitudinal section through the apparatus. Fig. 4, Plate 2, is a section taken transversely and centrally through the carrier and its track. Fig. 5, Plate 2, is a perspective view of the notched pawl.

Similar letters of reference indicate corresponding parts in the several figures.

This invention relates to certain novel improvements on the carrier used in unloading hay and other cut products, for which Letters Patent were granted to Thomas J. Powell on the 26th day of July, 1870, and assigned to myself and John C. De Lany. The improvement which I have made relates to a combination of a grooved pulley and a notched pawl with a chain which is attached to one end of the hoisting-rope, whereby the load, when fully elevated, will be positively sustained in such elevated position; also, to the construction of a tripping-plate for the hoisting-rope and the shank of the hook which is attached to said rope, so that the tripping-plate will be held in proper position to operate with certainty on a gravitating-dog.

To enable others skilled in the art to understand my invention, I will explain its construction and operation.

In the accompanying drawing, A represents a beam, which is of suitable width and thickness to afford a good track for the wheels $c\ c$ of the carrier. This track A has eyebolts $a$ secured into it and held fast by means of nuts $b\ b$, above and below. These eyebolts are arranged in the middle of the width of the track, as shown in Fig. 4, and they may be placed at any desired intervals along the length of the track, as the carrier-wheels $c\ c$ are applied on short studs which do not extend across the track. The hooks or eyebolts $a'$ are inserted into beams suitably arranged near the ridge of the barn, and suspend the track A so that it is allowed to swing from side to side. The carrier-frame is of a triangular form, with the base of the triangle upward. This frame B is contracted beneath the track, as shown in Fig. 4, and is also constructed with extensions B', for receiving the pivots of a gravitating-dog, E, and a gravitating-pawl, D. The frame B B' is made light and open, and is strengthened by means of ribs and braces formed on it, as shown in the drawing. By means of four wheels or rollers, $c\ c$, the carrier is supported on the track A, and by means of transverse bars $d\ d$ beneath the track the carrier is kept steady thereupon. At the lower part of the frame B B' is a grooved pulley, C, which is adapted both for a rope, R, and a chain, N. This pulley is annularly grooved at $e$ and shouldered at $e'$, so that the chain-links will adjust themselves to the pulley, as shown in Figs. 3 and 4. The chain N is a short piece attached to the hoisting-rope R, and has a hook, H, fastened to its end. D is a pawl, which is pivoted at $g$ to the extension B' of the carrier-frame, so that the notched biting-end $g'$ will drop, by its own gravity, upon the annular shoulders $e'\ e'$ of the pulley C when the carrier is moved away from a catch, F, on the bottom of the track A, as shown in Fig. 3. The shortest arm of the pawl D is curved, as shown, so that when brought against the inclined surface of the catch F, as shown in Fig. 1, the biting-end $g$ of this pawl will be raised and held free from the pulley C. When a load has been elevated to the proper height, a tripping-plate, G, will strike the loaded end $j'$ of a dog, E, and, by raising this end, release the hooked end $i$ from the catch F, thus allowing the carrier to be moved off and the pawl D to drop on the pulley C and hold the chain N. The dog E, as well as the pawl D, operate by gravity when released from their respective lifting devices; consequently, I dispense with springs and their attending objections. A pawl has been used in connection with a hoisting-rope and pulley, but it has been found that there is no certainty in the pawl catching and holding the rope, particularly when a very heavy load is being elevated. This objection is effectually removed by the use of a short chain, N, and a pawl, D, whose engaging end $g'$ will positively catch and hold the links and prevent them from slipping back. For the purpose of drawing the carrier back to the wagon after each discharge of a load upon the mow, I employ a rope, which is attached to an eye, $p$, cast on one side of the frame of the carrier, as shown in Figs. 1 and 4. The tripping-plate G is centrally perforated and constructed with a tube, K. The hook H, to which the load to be lifted is attached, is constructed with an annular shoulder, $l$, which, when the end of the tripping-plate tube $k$ rests on it, as shown in Figs. 2 and 3, will hold the plate G squarely and prevent it from tilting. Without the tube $k$ the plate G is not only liable to tilt, but it is also liable to catch upon the chain-links N and assume such a position that it will not trip the dog E when a load is elevated.

Having described my invention, what I claim as new is—

1. The combination of the pulley grooved as at $e\ e'$, the chain N on the hoisting-rope R, the pawl notched at $g'$, carrier-frame B, and stationary inclined tripping-catch F, all constructed and arranged to operate substantially in the manner herein described.

2. The combination of the tube K, the shoulder $l$ of the hook H, chain N, pivoted dog E $i$, and catch F, substantially as and for the purpose described.

3. The carrier-frame B B', contracted laterally beneath the track A, braced and otherwise constructed, substantially as described.

GEORGE SMITH.

Witnesses:
J. N. CAMPBELL,
EDM. F. BROWN.